Feb. 19, 1946. R. LAPSLEY ET AL 2,395,189
SYNCHRONIZER
Original Filed Feb. 7, 1940  2 Sheets—Sheet 2

INVENTORS
Robert Lapsley
Donald S. Dence
BY
Attorney

Patented Feb. 19, 1946

2,395,189

UNITED STATES PATENT OFFICE 2,395,189

SYNCHRONIZER

Robert Lapsley and Donald S. Dence, Berrien Spring, Mich., assignors to Clark Equipment Company, Buchanan, Mich., a corporation of Michigan Original application February 7, 1940, Serial No. 317,658. Divided and this application July 12, 1944, Serial No. 544,585

4 Claims. (Cl. 192—107)

This invention relates to synchronizers, and more particularly is directed to synchronizers for transmissions and the like involving friction cone rings and the method of and means for manufacturing and assembling the same on synchronizer sleeves. This application is a division of our copending applications Serial No. 317,658, now Patent No. 2,319,740, issued May 18, 1943 and Serial No. 382,952 filed March 12, 1941, and is directed particularly to the synchronizer sleeve and the means for assembling and securing the friction ring in said sleeve.

Heretofore, such rings have been formed from tubular stock which has been forged or otherwise shaped, and then the rings are pressed onto the receiving surfaces of the synchronizer sleeve. This has resulted in their cost being relatively high, and has also required relatively accurate fits in order to insure proper seating of the ring in the receiving recess of the sleeve.

The present invention contemplates reducing the cost of manufacture of the rings by forming them from metal blanks or strips which are cut to arcuate form and then rolled into proper form for insertion into the sleeve recesses. Such blanks or strips may be formed of a suitable ring material such as bronze sheets, or may be formed from a bi-metallic or clad metal in which a layer of bearing material is bonded to a steel base surface. When the blanks are stamped out of the sheet they are in arcuate form with the outer arc being equivalent to the circumference of the larger end of the ring and the inner arc being equivalent to the circumference of the smaller end. The blanks may be provided with oil grooves all milled simultaneously by a multiple milling operation, while the blank is in a flat form whereby when the blank is rolled into conical form the grooves are slightly dove-tailed in shape providing sharp cutting edges for the lubricant film.

Another feature of the present invention is to simplify the blank construction so that it may be quickly and economically formed and placed in position. The means for securing the blank in position is particularly advantageous since it insures the ring from moving axially with respect to the seat on the synchronizer sleeve, which axial lock may be secured either by bending inwardly a small axially projecting lip on the outer end of the sleeve recess, or by bending the inner edge of the blank into the blocking recesses formed in the sleeve.

It may also be desirable under certain conditions, such as where the angularity will not insure a tight press fit, to provide for interlocking the ring and the sleeve against relative circumferential movement. This can be readily accomplished during the forming operation, since the outer circumferential edge of the flat blank may be notched during the stamping operation and such notches form interlocking keys when the lip is bent thereover.

A still further feature of the present invention resides in the heat treating of the synchronizer sleeve in such manner that a relatively soft ductile lip is left after the machining operations which produce the tapered recess, whereby this lip can be readily bent over to lock the friction ring in position.

Thus, the synchronizer assembly may be designed so that the friction rings are interlocked, both axially and circumferentially, by relatively simple means insuring proper operation of the synchronizer in a transmission construction.

Other objects and advantages of the present invention will appear more fully from the following detailed description which, taken in conjunction with the accompanying drawings, will disclose to those skilled in the art the particular construction and operation of a preferred form of the present invention.

Figure 1:
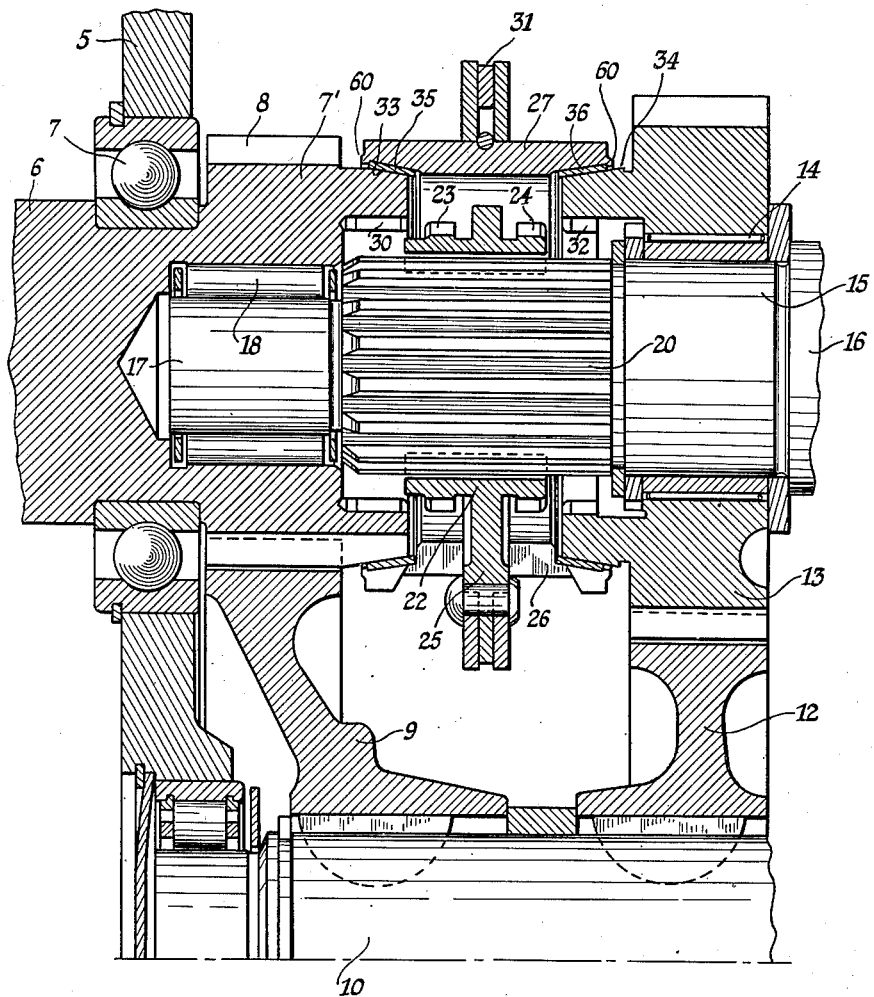
Figure 1 is a sectional view through a portion of a transmission illustrating a synchronizer embodying the present invention.

Referring now in detail to Figure 1, a more or less conventional type of transmission structure is shown in which the transmission case 5 has journalled therein the shaft 6 by means of bearing 7, the shaft 6 having an enlarged end 7' provided with the external gear teeth 8 adapted to mesh with the gear 9 keyed to the countershaft 10. A second gear 12 on the countershaft 10 is adapted to have meshing engagement with a gear 13 rotatably journalled as by the needle rollers 14 upon a shouldered portion 15 of a main transmission shaft 16 having its end 17 piloted in the recessed end of the shaft 6 by means of the bearings 18. Intermediate the end 17 and shoulder 15 of the shaft 16 the shaft is provided with a splined portion 20 upon which is mounted the clutch sleeve 22, this sleeve having external clutch teeth 23 and 24 at opposite ends thereof and being provided intermediate its ends with radially extending finger portions 25 adapted to extend through suitable openings 26 formed in an enclosing synchronizer sleeve 27.

Each of the gears 8 and 13 are provided with internal clutch teeth 30 and 32, respectively, adapted to be selectively engaged by the clutch sleeve 22 upon axial shifting movement thereof along the shaft portion 20.

Disposed radially outwardly of the clutch teeth 30 and 32, the gears 8 and 13 are provided with frusto-conical surfaces 33 and 34, respectively, adapted to be engaged by friction rings 35 and 36, respectively, carried by the synchronizer sleeve 27.

The main elements of the synchronizer construction, insofar as its blocking action and co-operative relation between the sleeve and clutch portions is concerned, is disclosed in detail in the copending application of Leo A. Bixby and Robert Lapsley, Serial No. 298,391, filed October 7, 1939, now Patent No. 2,256,308 issued September 16, 1941. The present invention more particularly is concerned with the manner in which the rings 35 and 36 are formed and the means by which they are secured within the frusto-conical recesses in the ends of the sleeve 27.

Figure 2:
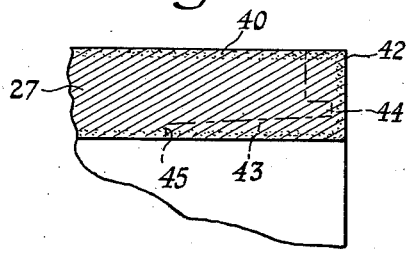
Figure 2 is a detailed view of a portion of the end of a synchronizer sleeve showing the manner in which the friction ring recess is formed.

Considering these features of the invention more in detail, the sleeve 27 is preferably subjected to a carburizing treatment in which it is packed in carbon and heated in a conventional manner to provide a depth of case substantially as shown by the layer 40 of case material as shown in Figure 2. This material is removed at the ends of the sleeve along the dotted line indicated at 42, providing the frusto-conical recessed surface 43 and the axially projecting lip 44. The surface 43 is of the same angled inclination as the surfaces 33 and 34 of the gears 8 and 13, but is radially enlarged so as to provide for the introduction of the friction ring carried by the synchronizer sleeve and adapted, upon initial movement of the clutch yoke 31 shown in Figure 1, to bear against the respective surfaces 33 and 34 to bring the selected gear and clutch to substantially synchronous relationship before the final clutching movement, whereby the clutch sleeve 22 is moved into meshing engagement with the associated gear.

Figure 7:
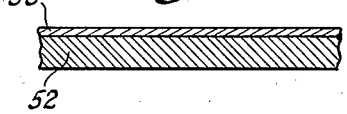
Figure 7 is a sectional view through one type of material which may be used in making the friction ring.

The friction ring 50 adapted to be received on the surface 43 is preferably formed from flat plate, such as bronze sheets or the like, or it may be formed from clad material such as shown in Figure 7 in which the base 52 is formed of mild steel, for example, and has a layer of bearing material 53 bonded thereto to form an integral union of the two materials and provide a sheet having a substantially uniform thickness of bearing material bonded thereon. It is apparent that either type of ring may be employed in any of the assemblies shown in Figures 1–6 inclusive.

Figure 3:
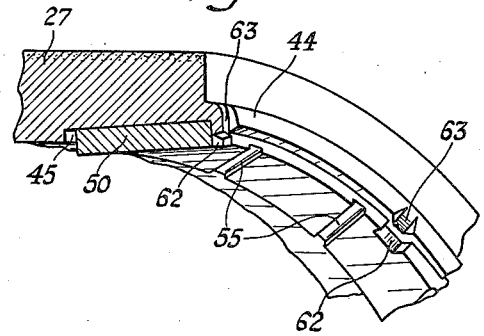
Figure 3 is a partial perspective view showing the friction ring in position.
Figure 4:
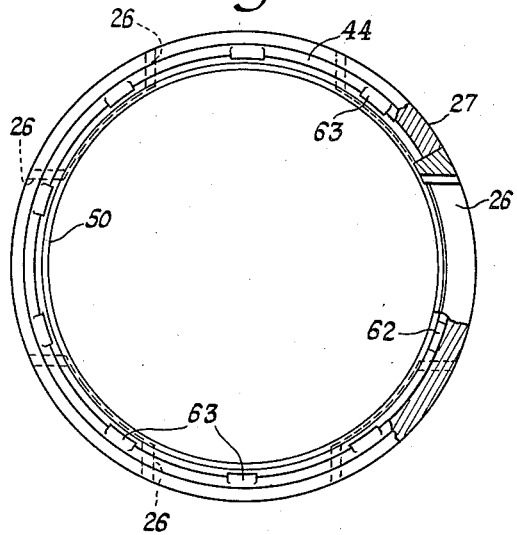
Figure 4 is an end elevational view of the synchronizer sleeve with the friction ring assembled therein.

Sheets of either of these types are then subjected to a stamping operation in which arcuate blanks 50 are stamped therefrom, these blanks having an outer arc equivalent to the circumference of the larger end of the cone ring and having inner arcs equivalent to the inner circumference of the cone ring. Such blanks are subjected while in the flat form to a multiple milling operation which provides a plurality of parallel grooves 55 in the face portion thereof, which grooves are preferably rectangular in section so that when the blank 50 has been rolled into conical form the defining edges of the groove, as shown clearly in Figure 3, present sharp cutting edges for cutting the oil film present on the surfaces 33 and 34 of the gears. The stamping is accurately cut to length so that when rolled into conical form the two ends abut in tight engagement, providing a ring when once pressed into the tapered recess 43. This ring is pressed along the tapered seat until a tight press fit is obtained, the dimensions being controlled so that the ring at no time moves inwardly into engagement with the radial shoulder 45. When the ring has thus been pressed into position, the outer end of the axial lip 44 is spun radially inwardly over the outer end or large diameter end of the ring, as shown at 60 in Figure 1, thereby locking the ring against outward axial displacement.

Depending upon the angularity desired on the friction surfaces, it may be desired in some cases to provide a circumferential interlocking between the ring and the synchronizer sleeve as well as the axial lock. For such purposes, the blank 50 shown in Figure 6 may be stamped with spaced notches 62 formed in the large diameter edge thereof, which notches thereby are disposed at the larger end of the frusto-conical ring when pressed into position. The swaging or pressing operation which bends over the lip 44 into engagement around the outer end of the ring 50 may then also provide for indentation of the lip into the notches 62 as shown at 63 in Figure 3, thereby providing a circumferential interlock preventing relative circumferential displacement between the ring and the synchronizer sleeve. Such a construction is shown in end elevation with portions broken away in Figure 4, and it will be at once apparent that with such a construction, both axial and circumferential movement of the ring relative to the synchronizer sleeve is prevented.

Figure 5:
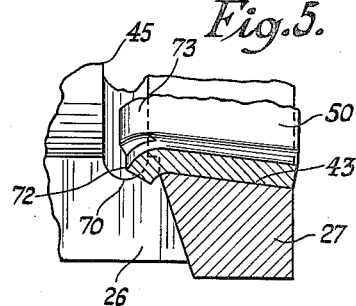
Figure 5 is a detailed sectional view showing a modified manner of interlocking the friction ring and sleeve.
Figure 6:
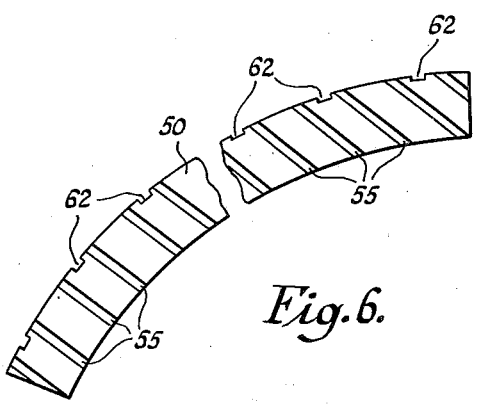
Figure 6 illustrates the blank from which the friction ring is formed.

An optional method of locking the ring 50 in position on the synchronizer sleeve 27 is illustrated in Figure 5, in which it will be noted that under-cut grooves 70 are providde in the internal surface of the synchronizer sleeve adjacent the finger openings 26. The inner or small end of the ring 50 in this form of the invention is bent into such grooves which extend circumferentially between the openings 26, and at the openings the inner end of the ring is bent inwardly as shown at 72 to provide the circumferential interlock, the axial interlock being provided by the radially inwardly bent portions 73 intermediate the openings 26. Thus, in this form of the invention, the same type of axial and circumferential interlock is produced, but the inner end of the ring is employed for this purpose in place of the outer end of the ring. This eliminates the necessity for the machining operations to cut off the excess materials along the dotted line 42 of Figure 2 as the synchronizer sleeve may be carburized and no further machining except for the surface 43 need be provided.

If desired, the modification shown in Figure 5 can be varied, for the sake of economy, by eliminating the undercut groove 70 and merely bending the lip or edge 72 radially outwardly over the defining ends of openings 26 to hold the ring 50 against axial outward displacement. In such case, the abutment of the bent lips 72 against the side walls of the openings 26 will hold the ring against circumferential displacement.

It is therefore believed apparent that we have provided a novel method of forming the friction rings from flat material and simultaneously providing the proper dimensional relationships and interlocking notches in the blanks in a single stamping operation. Such rings when produced are the equivalent of the forged rings previously employed, and have the advantage of greatly reduced cost of manufacture as well as facilitating the formation of the oil grooves therein.

In addition, it will be apparent that the novel type of means for locking the rings in position relative to the synchronizer sleeves is of great advantage in cases where either axial locking is required or where both axial and circumferential locking of the ring to the sleeve is necessary.

We are aware that various changes may be made in certain details of the present invention without, however, departing from the underlying principles thereof, and we therefore do not intend to be limited except as defined by the scope and spirit of the appended claims.

We claim:

1. In combination, a synchronizer sleeve having a series of circumferentially spaced openings intermediate its ends, an annular groove adjacent said openings and a continuous internal frusto-conical seat at one end, a friction ring pressed into said seat, and means carried by one end of said ring and pressed radially outwardly into said groove to lock said ring against axial movement relative to said seat with portions of said end being pressed into said openings to lock said ring against circumferential movement.

2. In combination, a synchronizer sleeve having a frusto-conical recess in one end thereof, a frusto-conical friction ring adapted to be pressed into said recess, said ring overlying the axial inner end of said recess and having the overlying portion bent radially outwardly axially to lock said ring against axial and circumferential movement relative to said sleeve.

3. A synchronizer sleeve having an annular recess in the end thereof, an annular friction ring seated in said recess and having a frusto-conical friction surface, said sleeve having formed therein at the inner end of said ring circumferentially spaced openings, the inner edge of said ring having portions thereof radially outwardly displaced into said openings to lock said ring and sleeve against relative axial and circumferential movement.

4. A synchronizer sleeve having an annular recess in the end thereof, a friction ring seated in said recess and having a frusto-conical friction surface, said sleeve having circumferentially spaced openings formed adjacent the inner edge of said ring and having an internal annular groove at the inner end of said recess, said ring having the inner edge thereof forced radially outwardly into said groove with portions thereof being pressed into said openings whereby said ring is locked against relative axial or circumferential movement with respect to said sleeve.

ROBERT LAPSLEY.
DONALD S. DENCE.